United States Patent [19]

Dunwoody

[11] Patent Number: 5,062,268
[45] Date of Patent: Nov. 5, 1991

[54] FLUID ACTUATOR

[75] Inventor: Andrew B. Dunwoody, Richmond, Canada

[73] Assignee: The University of British Columbia, Canada

[21] Appl. No.: 585,524

[22] Filed: Sep. 20, 1990

Related U.S. Application Data

[63] Continuation-in-part of Ser. No. 473,748, Feb. 2, 1990.

[51] Int. Cl.[5] ............................................. F15B 7/00
[52] U.S. Cl. ........................................ 60/533; 60/583; 60/593; 60/567; 91/519; 92/107; 92/151
[58] Field of Search ............... 60/533, 538, 545, 560, 60/566, 583, 593, 567; 91/519; 92/107, 151, 152; 417/521

[56] References Cited

U.S. PATENT DOCUMENTS

| | | | |
|---|---|---|---|
| 2,517,164 | 8/1950 | Arps | 91/519 |
| 3,045,433 | 7/1962 | Webber et al. | 60/560 |
| 3,068,841 | 12/1962 | Robbins . | |
| 3,072,146 | 1/1963 | Gizeski | 91/519 X |
| 3,407,601 | 10/1968 | Beck | 60/567 X |
| 3,566,748 | 3/1971 | Mahler | 92/151 X |
| 3,643,728 | 2/1972 | Fismer | 60/547.1 X |
| 3,885,393 | 5/1975 | Hanson | 60/583 |
| 4,072,013 | 2/1978 | Barbareschi | 60/593 X |
| 4,288,987 | 9/1981 | Grullmeier | 60/593 X |
| 4,602,481 | 7/1986 | Robinson . | |
| 4,620,419 | 11/1986 | Simson | 60/583 X |
| 4,667,473 | 5/1987 | Robinson | 92/152 X |
| 4,821,627 | 4/1989 | Leigh-Monstevens | 92/107 |
| 4,989,925 | 2/1991 | Kohno | 60/566 X |

FOREIGN PATENT DOCUMENTS

| | | | |
|---|---|---|---|
| 3236803 | 4/1984 | Fed. Rep. of Germany | 60/560 |
| 318566 | 10/1902 | France | 60/583 |
| 189712 | 5/1937 | Switzerland | 60/583 |

Primary Examiner—Edward K. Look
Assistant Examiner—Todd Mattingly
Attorney, Agent, or Firm—C. A. Rowley

[57] ABSTRACT

A hydraulic actuator is formed by a first element incorporating a plurality of different sized piston cavities by a first set of piston elements which cooperate with a second set of piston elements and piston cavities respectively formed on a second element. Each of the cavities is selectively connected to a source of high pressure fluid or a source of low pressure fluid. The second element forms a driven piston in a cylinder formed by an extension of the first element. A second cylinder of a cross sectional area different from the first cylinder is hydraulically connected to the first cylinder and incorporates a second piston at its end remote from the first piston. The force or distance travelled by the second piston is correlated with that of the first or driven piston in a ratio equal to the ratio of the cross sectional areas of the two pistons. Preferably the second piston will be a double acting piston so that pressure may be applied to force the driven piston and first element together.

16 Claims, 1 Drawing Sheet

FLUID ACTUATOR

This application is a continuation-in-part of application Ser. No. 07/473,748 filed Feb. 2, 1990.

FIELD OF THE PRESENT INVENTION

The present invention relates to an axially moveable adjustable force producing hydraulic actuator. More particularly the present invention relates to a hydraulic actuator wherein the force applied (or distance travelled) by a second piston is determined by the ratio of the areas of a first and second piston.

BACKGROUND OF THE PRESENT INVENTION

Generally linear digital hydraulic actuators are limited in those cases where a double action arrangement is required as the total area or range of pressures that may be applied are limited since the forces must be applied to move in both directions. This limits the variation in pressure that may be applied in any one direction or increases significantly the size of the actuator, see U.S. Pat. No. 4,602,481 issued July 29, 1986, to Robinson which discloses a linear double acting digital system of the kind described.

U.S. Pat. No. 3,068,841 issued Dec. 18, 1962, to Robbins et al discloses a system to permit rapid advance of a ram toward a workpiece under low power and low pumping volume requirements and for effecting full force against the work piece after the ram is positioned by utilizing different piston and cylinder sizes to obtain the desired results.

BRIEF DESCRIPTION OF THE PRESENT INVENTION

It is an object of the present invention to provide linearly operating digital hydraulic actuator wherein the force applied (or distance travelled) by the working piston is dependent on relative geometry of a working piston and a digitally driven piston.

Broadly the present invention relates to a digital hydraulic actuator comprising a fixed element, a driven piston cooperating with a first cylinder formed by said fixed element, means to digitally vary the pressure acting between said fixed element and said driven piston tending to displace said driven piston in said first cylinder, a second cylinder, a hydraulic coupling hydraulically connecting said first cylinder to said second cylinder, said second cylinder having a cross sectional area different from said first cylinder, a working piston in said second cylinder adapted to apply a force determined by the ratio of the cross sectional areas of said first and second cylinders.

Preferably said means to digitally vary the pressure acting between said fixed element and said driven piston includes a first set of different cross sectional area piston cavities and a first set of different cross section area pistons on said fixed element, a second set of different cross sectional area pistons and a second set of different cross sectional area piston cavities on said driven piston, each piston of said second set of pistons being received within said one of said cavities of said first set of piston cavities and each cavity of said set of piston cavities receiving a piston of said first set of pistons, and means to selectively apply fluid under selected pressures to each cavity of said first and said second sets of cavities.

Preferably said means to selectively apply fluid pressure will apply fluid under a first pressure or a second pressure different from said first pressure to each cavity in said first and said second sets of cavities.

Preferably said operating piston will be a double acting piston and means will be provided to apply fluid under pressure under the side of said piston remote from said fluid coupling.

Preferably said hydraulic coupling will comprise a straight tubular passage section interconnecting said first and second cylinders and having a portion changing the cross sectional size of said passage from a cross sectional area equal to that of said first cylinder to a cross sectional area equal to that of said second cylinder.

Preferably said first set of cylinders and said first set of pistons will be concentric and pistons of said first set will separate and form the walls of cavities of said first set.

Preferably said second set of cylinders and said second set of pistons will be concentric and pistons of said second set will separate and form the walls of cavities of said second set.

Preferably means will be provided to adjust the amount of fluid in said fluid coupling to maintain the spacing between said driven and said working pistons within a preselected range.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENT

Figure 1:
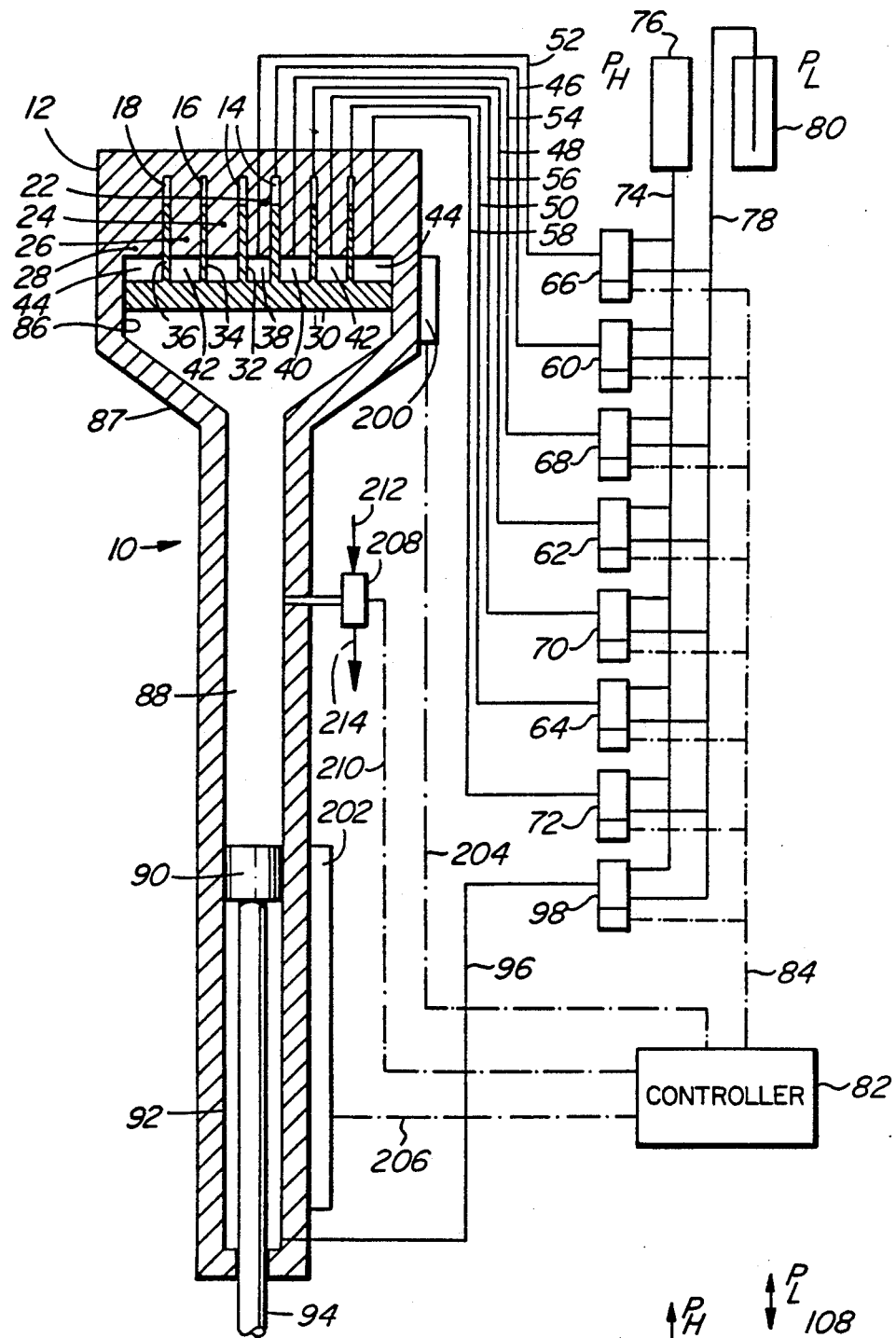
FIG. 1 is a cross-section through a preferred form of digital actuator constructed in accordance with the present invention.

The digital hydraulic actuator 10 illustrated in FIG. 1 includes a first or fixed element 12 having a plurality of annular piston cavities 14, 16, 18 and 20 forming a first set of piston cavities separated (surrounded) by a plurality of annular pistons 22, 24, 26 and 28 forming a first set of pistons.

Figure 2:
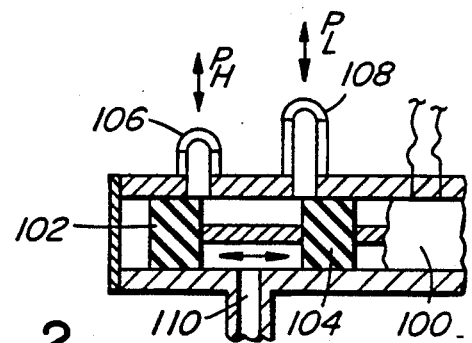
FIG. 2 is a schematic cross section through a typical two-way valve that may be used with the present invention.

A driven piston or second element 30 is formed with a plurality of annular pistons 32, 34 and 36 forming a second set of pistons and a second set of discrete annular piston cavities 38, 40, 42 and 44. The second set of pistons 32, 34 and 36 are received within the first set of piston cavities 14, 16 and 18 while the first set of pistons 22, 24, 26 and 28 are received within the second set of piston cavities 38, 40, 42 and 44 respectively. Each of the cavities 14, 16, 18, 34, 40, 42, and 44 are connected via lines 46, 48, 50, 52, 54, 56 and 58 respectively to their respective valves 60, 66, 68, 70 and 72 respectively. Each of these valves are essentially the same and will be described in more detail with respect to FIG. 2. Each is adapted to be moved from first position connecting its respective cylinder to the high pressure line 74 leading from a high pressure tank 76 and designated by the symbol $P_H$ or to the low pressure line 78 connected to the low pressure source of hydraulic fluid 80 as symbolized by the symbol $P_L$. These valves 60, 62, 64, 66, 68, 70 and 72 are controlled via a controller 82 as indicated by the dot/dash lines 84 to apply either a high pressure or a low pressure to each of the cavities and thereby vary the total pressure tending to separate the two elements 12 and 30.

It is preferred that there by a direct relationship between the cross sectional areas of the various cavities of the first and second sets of cavities to obtain a digital effect by properly connecting the various cavities to either the source of high or low pressure to increase the pressure in selected steps, i.e. each cavity will have a cross sectional area that is a direct ratio to the cross sectional areas of the other cavities, e.g. multiples of two.

The actuator 10 of the present invention incorporates an annular extension to the element 12 which forms a first cylinder 86 in which the driven piston or second element 30 mates to form a hydraulic piston 30 and cylinder 86. The axial length of the cylinder 86 is sufficient to accommodate movement of the piston 30 for the full extension of the pistons of the first and second sets of pistons in the second and first sets of piston cavities respectively. The cooperation of the piston 30 in the cylinder 86 guides and better ensures that the small piston elements i.e. the pistons of the first and second sets of pistons extending between the driven piston 30 and the first element 12 are not broken.

The cylinder 86 is connected via a hydraulic coupling section 88 to a second cylinder 92 accommodating a second or working piston 90. In the illustrated arrangement this coupling is a straight tubular passage as is preferred, however it could if desired be bent. The cross sectional area of the piston 90 in the illustrated arrangement is significantly less than the cross sectional area of the piston 30. Thus, the pressure applied by the piston 30 through the fluid coupling 88 will result in a corresponding pressure applied to the piston 90 and the piston rod 94 connected thereto. If the ratio of the areas of the piston 30 and 90 are 10 to 1 then the force applied to the piston 90 will be 10 times that of piston 30 (the total pressures will be essentially the same) and the movement, if the piston 90 is free to move will be such that a 1/10 of an inch movement of the piston 30 will result in a full inch of travel of the piston 90. Thus a significant increase in the travel of the working piston 90 can be obtained through the use of different cross sectional areas of the pistons 30 and 90.

To accommodate the differences in cross sectional areas of the first and second cylinders 86 and 92 the hydraulic coupling 88 has a tapered section 87 gradually changing the cross sectional area from the larger area of cylinder 86 to the smaller area of cylinder 92.

To move the element 30 toward the element 12 the side of the piston 90 remote from the coupling 88 is connected via line 96 to a further two position valve 98 that may be connected to the high pressure source while a sufficient number of the cavities of the first and second sets of cavities between the elements 12 and 30 are connected to a low pressure source whereby the pressure acting on the piston 90 in the direction toward the piston 30 is sufficient to force the piston 90 upward in FIG. 1 and force the element or piston 30 to approach the element 12.

As above indicated the valves 60, 62, 65, 66, 68, 70, 72 and 98 may be any suitable valve to connect the actuator to one pressure source or another. In the valve system schematically illustrated in FIG. 2, the valve has a controlled solenoid 100 that moves the body of the valve formed by two interconnected spools 102 and 104 back and forth to open and close the two inlet ports 106 and 108; one for high pressure (106) and one for low pressure (108) intermediate port 110 connects the valve to its respective line 46, 48, 50, 52, 54, 56, 58 or 96.

It will be apparent that as the valve moves to close off one of the ports, say port 106 and open the other port 108, it opens the port 108 before it totally closes off the port 96 as indicated by dimension X. Obviously a similar phenomena occurs when the valve is moved in the opposite direction to close off port 108 and open port 106. The rate of movement of the cylinders 102 and 104 to open and close the ports 106 and 108 is relatively rapid thus the time period in which both ports are simultaneously cracked open is small but it ensures that there is no significant build up of pressure during the transition during the high and low pressure forces.

The description has dealt with only two hydraulic pressures, it will be apparent that more than two could be used with appropriate valve changes so that any one pressure of a number of different pressures could be applied selectively to the cavities. The elements 200 and 202 schematically indicate sensors for sensing the position of the piston at 30 and 90 respectively and for which information is transmitted to the controller 82 as indicated by lines 204 and 206. If the fluid within the chamber for some reason increases or decreases the valve 208 is operated to inject fluid as indicated by the numeral 212 or extract the fluid as indicated by the number 214. The system will operate quite satisfactorily without this unit assuming there is good sealing by the pistons 30 and 90 respectively.

Having described the invention, modifications will be evident to those skilled in the art without departing from the spirit of the invention as defined in the appended claims.

I claim:

1. A digital hydraulic actuator comprising a fixed element, a driven piston cooperating with a first cylinder formed by said fixed element, means to digitally vary the pressure acting between said fixed element and said driven piston tending to displace said driven piston in said first cylinder, said means to digitally vary the pressure acting between said fixed element and said driven piston including a first set of different cross sectional area piston cavities and a first set of different cross section area pistons on said fixed element, a second set of different cross sectional area pistons and a second set of different cross sectional area piston cavities on said driven piston, each piston of said second set of pistons being received within said one of said cavities of said first set of piston cavities and each cavity of said second set of piston cavities receiving a piston of said first set of pistons, and means to selectively apply fluid under selected pressures to each cavity of said first and said second sets of cavities, a second cylinder, a hydraulic coupling hydraulically connecting said first cylinder to said second cylinder, said second cylinder having a cross sectional area different from said first cylinder, a working piston in said second cylinder adapted to apply a force determined by the ratio of the cross sectional areas of said first and second cylinders.

2. A digital hydraulic actuator as defined in claim 1 wherein said means to selectively apply pressure applies one of a first or a second pressure to each of said cavities, said first and second pressures being significantly different.

3. A digital hydraulic actuator as defined in claim 2 wherein said working piston is a double acting piston and further comprising means to apply fluid under pressure under the side of said working piston remote from said fluid coupling.

4. A digital hydraulic actuator as defined in claim 2 wherein said hydraulic coupling comprises a straight tubular passage section interconnecting said first and said second cylinders and includes a portion changing the cross sectional size of said passage from a cross sectional area equal to that of said cylinder to a cross sectional area equal to that of said second cylinder.

5. A digital hydraulic actuator as defined in claim 2 wherein said first set of cylinders and said first set of pistons are concentric and pistons of said first set separate and form the walls of cavities of said first set of cavities.

6. A digital hydraulic actuator as defined in claim 2 wherein said second set of cylinders and said second set of pistons are concentric and pistons of said second set separate and form the walls of cavities of said second set of cavities.

7. A digital hydraulic actuator as defined in claim 3 wherein said hydraulic coupling comprises a straight tubular passage section interconnecting said first and said second cylinders and includes a portion changing the cross sectional size of said passage from a cross sectional area equal to that of said first cylinder to a cross sectional area equal to that of said second cylinder.

8. A digital hydraulic actuator as defined in claim 3 wherein said first set of cylinders and said first set of pistons are concentric and pistons of said first set separate and form the walls of cavities of said first set of cavities.

9. A digital hydraulic actuator as defined in claim 3 wherein said second set of cylinders and said second set of pistons are concentric and pistons of said second set separate and form the walls of cavities of said second set of cavities.

10. A digital hydraulic actuator as defined in claim 4 wherein said first set of cylinders and said first set of pistons are concentric and pistons of said first set separate and form the walls of cavities of said first set of cavities.

11. A digital hydraulic actuator as defined in claim 4 wherein said second set of cylinders and said second set of pistons are concentric and pistons of said second set separate and form the walls of cavities of said second set of cavities.

12. A digital hydraulic actuator as defined in claim 6 wherein said second set of cylinders and said second set of pistons are concentric and pistons of said second set separate and form the walls of cavities of said second set of cavities.

13. A digital hydraulic actuator as defined in claim 7 wherein said second set of cylinders and said second set of pistons are concentric and pistons of said second set separate and form the walls of cavities of said second set of cavities.

14. A digital hydraulic actuator as defined in claim 9 wherein said second set of cylinders and said second set of pistons are concentric and pistons of said second set separate and form the walls of cavities of said second set of cavities.

15. A digital hydraulic actuator as defined in claim 1 wherein said working piston is a double acting piston and further comprising means to apply fluid under pressure under the side of said working piston remote from said fluid coupling.

16. A digital hydraulic actuator as defined in claim 1 wherein said hydraulic coupling comprises a straight tubular passage section interconnecting said first and said second cylinders and includes a portion changing the cross sectional size of said passage from a cross sectional area equal to that of said first cylinder to a cross sectional area equal to that of said second cylinder.

* * * * *